(12) United States Patent
Kawakami

(10) Patent No.: US 11,476,750 B2
(45) Date of Patent: Oct. 18, 2022

(54) VEHICLE POWER SUPPLY DEVICE WITH CHARGE CIRCUIT SECTION

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takafumi Kawakami, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 23 days.

(21) Appl. No.: 17/058,377

(22) PCT Filed: May 14, 2019

(86) PCT No.: PCT/JP2019/019069
§ 371 (c)(1),
(2) Date: Nov. 24, 2020

(87) PCT Pub. No.: WO2019/225396
PCT Pub. Date: Nov. 28, 2019

(65) Prior Publication Data
US 2021/0313874 A1    Oct. 7, 2021

(30) Foreign Application Priority Data

May 24, 2018 (JP) .............................. JP2018-099804

(51) Int. Cl.
*H02M 1/32* (2007.01)
*H02M 1/36* (2007.01)
(Continued)

(52) U.S. Cl.
CPC ............... *H02M 1/32* (2013.01); *H02M 1/36* (2013.01); *H02M 3/073* (2013.01); *H02M 3/158* (2013.01)

(58) Field of Classification Search
CPC .......... H02M 1/32; H02M 1/36; H02M 3/073; H02M 3/158
See application file for complete search history.

(56) References Cited

U.S. PATENT DOCUMENTS

| 8,269,467 B2 * | 9/2012 | Li ........................... H02J 7/045 |
| | | 320/160 |
| 2017/0207634 A1 | 7/2017 | Katano et al. |

(Continued)

FOREIGN PATENT DOCUMENTS

| JP | 2014-87204 A | 5/2014 |
| JP | 2014-155298 A | 8/2014 |

(Continued)

OTHER PUBLICATIONS

International Search Report, Application No. PCT/JP2019/019069, dated Jul. 16, 2019. ISA/Japan Patent Office.

*Primary Examiner* — Rafael O De Leon Domenech
(74) *Attorney, Agent, or Firm* — Honigman LLP

(57) ABSTRACT

A configuration with which a precharging operation of a capacitive component present on one side of a voltage conversion section can be performed and the current during the precharging operation can be controlled is realized more simply. An on-board power supply device includes a charge circuit section which is connected in parallel with a voltage conversion section between a first conduction path and a second conduction path, and which performs a step-down operation in which a voltage applied to the second conduction path is stepped down by a switch portion switching on and off and an output voltage is applied to the first conduction path. A control unit outputs a second control signal that (Continued)

alternately switches between an on signal and an off signal to the switch portion of the charge circuit section when a predetermined precharging condition is satisfied.

11 Claims, 4 Drawing Sheets

(51) Int. Cl.
*H02M 3/07* (2006.01)
*H02M 3/158* (2006.01)

(56) References Cited

U.S. PATENT DOCUMENTS

2019/0097277 A1* 3/2019 Fukae ..................... H02J 7/342
2019/0168634 A1* 6/2019 Teng ....................... B60L 50/50

FOREIGN PATENT DOCUMENTS

JP 2015-12670 A 1/2015
JP 2017-184333 A 10/2017

* cited by examiner

VEHICLE POWER SUPPLY DEVICE WITH CHARGE CIRCUIT SECTION

CROSS-REFERENCE TO RELATED APPLICATIONS

This application is the U.S. national stage of PCT/JP2019/019069 filed on May 14, 2019, which claims priority of Japanese Patent Application No. JP 2018-099804 filed on May 24, 2018, the contents of which are incorporated herein.

TECHNICAL FIELD

The present disclosure relates to an on-board power supply device.

BACKGROUND

In on-board power supply systems, there are cases in which a power source (e.g. a battery) is electrically disconnected from other components by means of a contactor and standby is entered when a vehicle system is stopped (for example, when the ignition is turned off). In this type of configuration, there is a risk that, when the contactor is switched on, an inrush current may flow into a capacitive component (for example, a capacitive component of a load) disconnected from the power source during standby and may cause contactor damage or the like.

In order to solve such a problem, in JP 2017-184333A, a plurality of shunt circuits are disposed by parallelly connecting a plurality of circuits in which a resistor and a switch are connected in series, so that a charge current increases gradually. However, the configuration in JP 2017-184333A has the problem that the number of parallel shunts needs to be increased and the circuit configuration becomes large if there is a large-capacity capacitive component.

The present disclosure has been made in order to solve at least one of the above-described problems, and aims to more simply realize a configuration with which a precharging operation of a capacitive component present on one side of a voltage conversion section can be performed and the current during the precharging operation can be controlled.

SUMMARY

An on-board power supply device according to a first aspect of the present disclosure is an on-board power supply device that at least performs a voltage conversion operation in which a voltage applied to a first conduction path that serves as an electric power supply path from a first power source unit is converted and an output voltage is applied to a second conduction path disposed on a second power source unit-side. The on-board power supply device includes a voltage conversion section that includes a driving switching element that switches on and off when a first control signal that is alternately switched between an on signal and an off signal. The voltage conversion section performs a voltage conversion operation in which a voltage applied to the first conduction path is stepped up or down by the driving switching element switching on and off and is applied to the second conduction path. A control unit outputs the first control signal to the driving switching element. A charge circuit section is connected in parallel with the voltage conversion section between the first conduction path and the second conduction path. The charge section includes a switch portion and an inductor, and performs a step-down operation in which a voltage applied to the second conduction path is stepped down by the switch portion switching on and off and an output voltage is applied to the first conduction path, wherein the control unit outputs a second control signal that alternately switches between an on signal and an off signal to the switch portion of the charge circuit section when a predetermined precharging condition is satisfied.

An on-board power supply device according to a second aspect of the present disclosure is an on-board power supply device that at least performs a voltage conversion operation in which a voltage applied to a first conduction path that serves as an electric power supply path from a first power source unit is converted and an output voltage is applied to a second conduction path disposed on a second power source unit-side. The on-board power supply device includes a voltage conversion section that includes a driving switching element that switches on and off when a first control signal that is alternately switched between an on signal and an off signal. The voltage conversion section performs a voltage conversion operation in which a voltage applied to the first conduction path is stepped up or down by the driving switching element switching on and off and is applied to the second conduction path. A control unit outputs the first control signal to the driving switching element. A charge circuit section is connected in parallel with the voltage conversion section between the first conduction path and the second conduction path, which is formed by at least a switch portion, a diode, and a resistor portion being connected in series, and in which an anode of the diode is disposed on the second conduction path-side and a cathode of the diode is disposed on the first conduction path-side, wherein the control unit outputs a second control signal that alternately switches between an on signal and an off signal to the switch portion of the charge circuit section when a predetermined precharging condition is satisfied.

ADVANTAGEOUS EFFECTS OF DISCLOSURE

In the on-board power supply devices according to the first and second aspects of the present disclosure, the charge circuit section operates so as to supply a charge current to the first conduction path-side due to the control unit providing the charge circuit section with the second control signal when the predetermined precharging condition is satisfied. Accordingly, a first conduction path-side capacitive component can be charged if the predetermined precharging condition is satisfied. Moreover, since the charge current can be controlled by switching the switch portion on and off, a configuration with which the current during the precharging operation can be controlled can be realized simply.

DETAILED DESCRIPTION OF PREFERRED EMBODIMENTS

Figure 1:
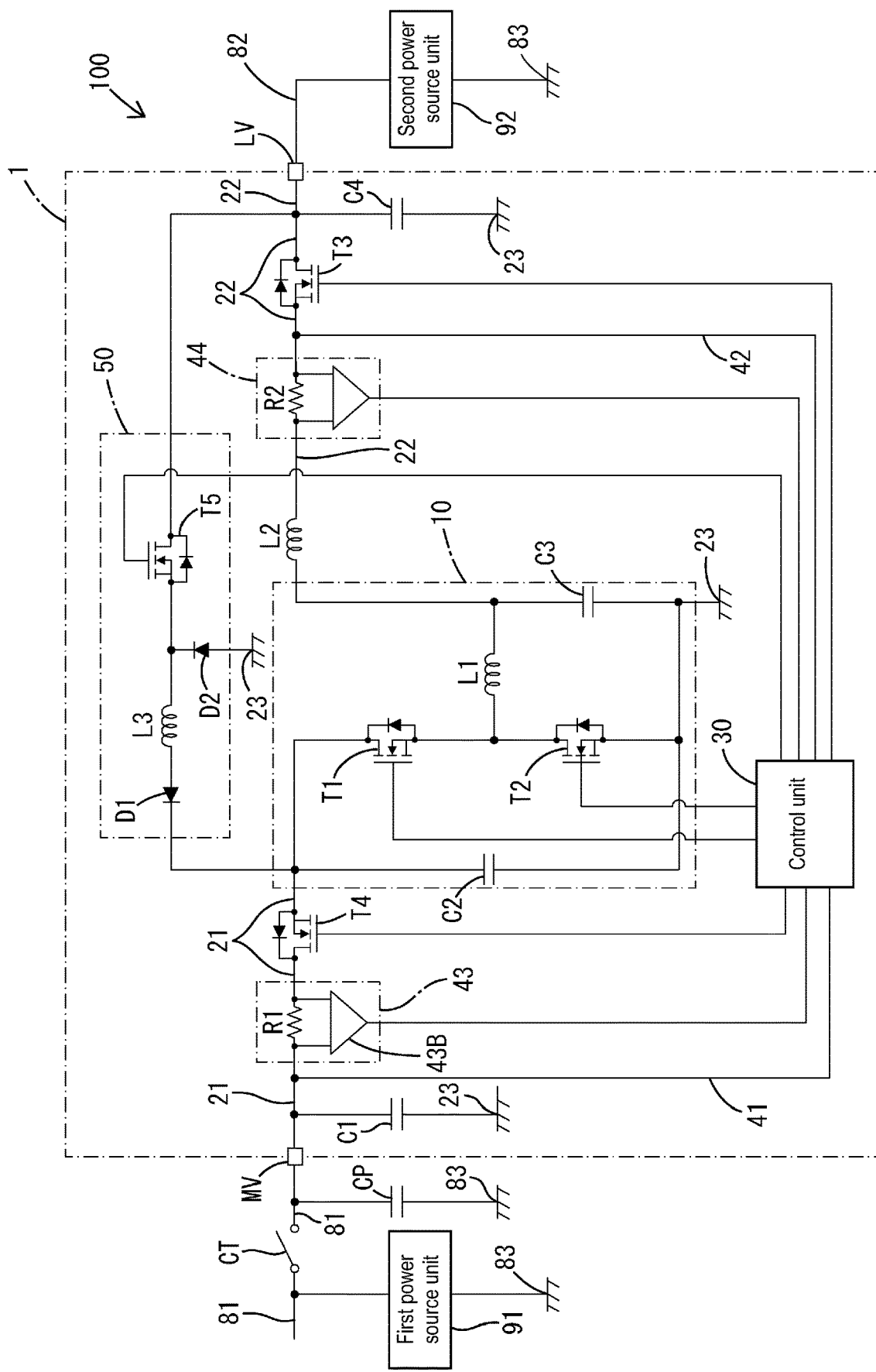
FIG. 1 is a circuit diagram schematically illustrating an example of an on-board power supply system including an on-board power supply device according to a first embodiment.

Examples of preferable embodiments of the present disclosure will be described in the following. However, the present disclosure is not limited to the following configurations.

The on-board power supply devices according to the first and second aspects may include a voltage detection section that detects a voltage value of the first conduction path. Furthermore, the control unit may be configured to cause the voltage conversion section to perform a step-up operation in which a voltage applied to the second conduction path is stepped up and applied to the first conduction path in a case in which the voltage value of the first conduction path, which is detected by the voltage detection section, reaches a predetermined value after the control unit outputs the second control signal to the switch portion of the charge circuit section when the precharging condition is satisfied.

According to this configuration, step-up charging can be performed after step-down charging is performed in a case in which a precharging operation of a capacitive component on the first conduction path-side is performed, and the charge voltage of the capacitive component can be increased so as to be higher than the voltage of the second conduction path.

The on-board power supply devices according to the first and second aspects may include a protection switching element that is disposed in the first conduction path and that switches between an on state in which the protection switching element permits conduction from the first power source unit-side to the voltage conversion section-side and an off state in which the protection switching element does not permit conduction from the first power source unit-side to the voltage conversion section-side, and a capacitor one end of which is electrically connected between the voltage conversion section and the protection switching element in the first conduction path and the other end of which is electrically connected to a ground-side. Furthermore, one end of the charge circuit section may be electrically connected between the voltage conversion section and the protection switching element in the first conduction path.

By adopting such a configuration, the above-described capacitor can be charged by the precharging operation, and an inrush current into the above-described capacitor can be suppressed after the precharging operation.

In the on-board power supply devices according to the first and second aspects, the control unit may be configured so as to control a duty ratio of the second control signal so that a value of a current flowing in the first conduction path equals a predetermined target current value.

By adopting such a configuration, the capacitive component can be charged while controlling the current in the first conduction path to a desired value during the precharging operation.

First Embodiment

In the following, a first embodiment that is an embodiment of the present disclosure will be described.

An on-board power supply system 100 illustrated in FIG. 1 includes a first power source unit 91 and a second power source unit 92, which are configured as on-board power source units, and an on-board power supply device 1 (also referred to simply as "power supply device 1" in the following), and is configured as a system that can supply electric power to unillustrated loads (for example, loads that are electrically connected to a first conduction path 21 and a second conduction path 22), that are installed to a vehicle. The loads are on-board electric components, and there is no limitation to the types and number of loads.

The first power source unit 91 is constituted of an electricity-accumulating means such as a lithium-ion battery or an electric double layer capacitor, for example, and generates a first predetermined voltage. The high-potential-side terminal of the first power source unit 91 is maintained at a predetermined voltage (for example, 24V, 48V, or the like), and the low-potential-side terminal of the first power source unit 91 is maintained at a ground potential (0V), for example. The high-potential-side terminal of the first power source unit 91 is electrically connected to a wiring section 81 disposed inside the vehicle, and the first power source unit 91 applies the predetermined voltage to the wiring section 81. The low-potential-side terminal of the first power source unit 91 is electrically connected to a reference conduction path 83, which is configured as an in-vehicle ground portion. The wiring section 81 is connected to an input-side terminal MV of the power supply device 1, and is electrically connected with the first conduction path 21 via the input-side terminal MV.

The second power source unit 92 is constituted of an electricity-accumulating means such as a lead battery, for example, and generates a second predetermined voltage that is lower than the first predetermined voltage generated by the first power source unit 91. The high-potential-side terminal of the second power source unit 92 is maintained at 12V, and the low-potential-side terminal of the second power source unit 92 is maintained at the ground potential (0V), for example. The high-potential-side terminal of the second power source unit 92 is electrically connected to a wiring section 82 disposed inside the vehicle, and the second power source unit 92 applies the predetermined voltage to the wiring section 82. The low-potential-side terminal of the second power source unit 92 is electrically connected to the reference conduction path 83. The wiring section 82 is connected to an output-side terminal LV of the power supply device 1, and is electrically connected with the second conduction path 22 via the output-side terminal LV.

The reference conduction path 83 is configured as the ground in the vehicle, and is maintained at the constant ground potential (0V). The low-potential-side terminal of the first power source unit 91 and the low-potential-side terminal of the second power source unit 92 are electrically connected to this reference conduction path 83, and a ground portion of the power supply device 1 is also electrically connected to the reference conduction path 83 via an unillustrated ground terminal.

The power supply device 1 is configured as an on-board step-up/step-down DC/DC converter that is installed and used inside the vehicle. The power supply device 1 mainly includes the first conduction path 21, the second conduction path 22, a third conduction path 23, a voltage conversion section 10, a control unit 30, voltage detection sections 41 and 42, current detection sections 43 and 44, a charge circuit section 50, protective switching elements T3 and T4, the input-side terminal MV, and the output-side terminal LV, for example.

The first conduction path 21 serves as an electric power supply path from the first power source unit 91, and is configured as a primary-side (high-voltage-side) power supply line to which a relatively high voltage is applied. The first conduction path 21 is electrically connected to one end side of the wiring section 81, and is configured so that, when a contactor CT is on, the first conduction path 21 is electrically connected to the high-potential-side terminal of the first power source unit 91 via the wiring section 81, and a predetermined DC voltage is applied to the first conduction path 21 from the first power source unit 91. In the configuration in FIG. 1, the input-side terminal MV is disposed at an end of the first conduction path 21, and the wiring section 81 is electrically connected to this input-side terminal MV.

The second conduction path 22 is configured as a secondary-side (low-voltage-side) power supply line to which a relatively low voltage is applied. The second conduction path 22 is electrically connected to the wiring section 82, and is configured so that the second conduction path 22 is electrically connected to the high-potential-side terminal of the second power source unit 92 via the wiring section 82 and a DC voltage that is lower than the output voltage of the first power source unit 91 is applied to the second conduction path 22 from the second power source unit 92. In the configuration in FIG. 1, the output-side terminal LV is disposed at an end of the second conduction path 22, and the wiring section 82 is electrically connected to this output-side terminal LV.

The voltage conversion section 10 includes a high-side driving switching element T1 (also referred to simply as "switching element T1" in the following) that is disposed between the first conduction path 21 and the second conduction path 22 and configured as a semiconductor switching element that is electrically connected to the first conduction path 21, a low-side driving switching element T2 (also referred to simply as "switching element T2" in the following) that is configured as a semiconductor switching element that is electrically connected between the first conduction path 21 and the third conduction path 23 (a conduction path that is maintained at a predetermined reference potential that is lower than the potential of the first conduction path 21), and a first inductor L1 (also referred to as "inductor L1" in the following) that is electrically connected between the switching elements T1 and T2 and the second conduction path 22. The voltage conversion section 10 forms the main part of a switching-type step-down DC/DC converter, and can perform a step-down operation in which the voltage applied to the first conduction path 21 is stepped down by switching the switching element T1 on and off and is output to the second conduction path 22. In addition, the voltage conversion section 10 can perform a step-up operation in which the voltage applied to the second conduction path 22 is stepped up by switching the switching element T2 on and off and is output to the first conduction path 21.

In the voltage conversion section 10, a capacitor C2 is disposed between the first conduction path 21 and the third conduction path 23, and a capacitor C3 is disposed between the second conduction path 22 and the third conduction path 23.

One end of the capacitor C2 is electrically connected to the node between the switching element T1 and a switching element T4 in the first conduction path 21, and the other end is electrically connected to the third conduction path 23. The capacitor C2 is a first conduction path 21-side smoothing capacitor in the voltage conversion section 10. The capacitor C2 functions as an input capacitor of the voltage conversion section 10 (DC/DC converter) when the voltage conversion section 10 performs the step-down operation, and functions as an output capacitor of the voltage conversion section 10 (DC/DC converter) when the voltage conversion section 10 performs the step-up operation.

One end of the capacitor C3 is electrically connected to the node between a second inductor L2 and the first inductor L1 in the second conduction path 22, and the other end is electrically connected to the third conduction path 23. The capacitor C3 is a second conduction path 22-side smoothing capacitor in the voltage conversion section 10. The capacitor C3 functions as an output capacitor of the voltage conversion section 10 (DC/DC converter) when the voltage conversion section 10 performs the step-down operation, and functions as an input capacitor of the voltage conversion section 10 (DC/DC converter) when the voltage conversion section 10 performs the step-up operation.

The switching element T1 and the switching element T2 are both configured as N-channel MOSFETs, and one end of the first conduction path 21 is connected to the drain of the high-side switching element T1. The drain of the switching element T1 is electrically connected to one-side electrode of the capacitor C2 and can also be electrically connected to the high-potential-side terminal of the first power source unit 91 via the first conduction path 21 and the wiring section 81, and current can flow between these elements. Also, the drain of the low-side switching element T2 and one end of the inductor L1 are electrically connected to the source of the switching element T1, and current can flow between these elements. Drive and non-drive signals (specifically, a PWM signal) from the control unit 30 are input to the gate of the switching element T1, and the switching element T1 switches on and off in accordance with the signals from the control unit 30.

The third conduction path 23 is connected to the source of the low-side switching element T2. The third conduction path 23 is a conduction path that is electrically connected to the reference conduction path 83 (the ground portion) inside the vehicle, and is maintained at a potential that is at the same level as the potential (0V) of the reference conduction path 83, thus functioning as a ground. The other electrode of each of the capacitors C2 and C3 is electrically connected to this third conduction path 23. Drive and non-drive signals from the control unit 30 are also input to the gate of the low-side switching element T2, and the switching element T2 switches on and off in accordance with the signals from the control unit 30.

One end of the inductor L1 is connected to a connecting node between the switching element T1 and the switching element T2, and this one end is electrically connected to the source of the switching element T1 and the drain of the switching element T2. The other end of the inductor L1 is connected to the second conduction path 22 (specifically, to a portion located further toward the voltage conversion section 10 from the second inductor L2 in the second conduction path 22).

The current detection section 43 includes a resistor portion R1 and a differential amplifier 43B, and outputs a value indicating the current flowing in the first conduction path 21 (specifically, an analog voltage that correlates with the value of the current flowing in the first conduction path 21). The voltage drop in the resistor portion R1 caused by the current flowing in the first conduction path 21 is amplified by the differential amplifier 43B, yielding a detection voltage (analog voltage) that correlates with the current, and is input to the control unit 30. Furthermore, this detection voltage (analog voltage) is converted into a digital value by an unillustrated A/D converter disposed in the control unit 30.

The current detection section 44 includes a resistor portion R2 and a differential amplifier 44B, and outputs a value indicating the current flowing in the second conduction path 22 (specifically, an analog voltage that correlates with the value of the current flowing in the second conduction path 22). The voltage drop in the resistor portion R2 caused by the current flowing in the second conduction path 22 is amplified by the differential amplifier 44B, yielding a detection voltage (analog voltage) that correlates with the current, and is input to the control unit 30. Furthermore, this detection voltage (analog voltage) is converted into a digital value by the unillustrated A/D converter disposed in the control unit 30.

The voltage detection section 41 is connected to the first conduction path 21 and is configured to input a value that correlates with the voltage of the first conduction path 21 to the control unit 30. The voltage detection section 41 may be a known voltage detection circuit that can input a value indicating the voltage of the first conduction path 21 (a value specifying the potential difference between the potential of the first conduction path 21 and the potential of the reference conduction path 83) to the control unit 30, and while the voltage detection section 41 is configured as a conduction path that inputs a voltage value at a predetermined position of the first conduction path 21 to the control unit 30 in the example in FIG. 1, the voltage detection section 41 may also be configured as a voltage-dividing circuit such as one that divides the voltage of the first conduction path 21 and inputs the divided voltage to the control unit 30. Similarly, the voltage detection section 42 is connected to the second conduction path 22, and is configured to input a value that correlates with the voltage of the second conduction path 22 (a value specifying the potential difference between the potential of the second conduction path 22 and the potential of the reference conduction path 83) to the control unit 30. The voltage detection section 42 may be a known voltage detection circuit that can input a value indicating the voltage of the second conduction path 22 to the control unit 30, and while the voltage detection section 42 is configured as a conduction path that inputs a voltage value at a predetermined position of the second conduction path 22 to the control unit 30 in the example in FIG. 1, the voltage detection section 42 may also be configured as a voltage-dividing circuit such as one that divides the voltage of the second conduction path 22 and inputs the divided voltage to the control unit 30.

The protection switching element T4 is interposed in the first conduction path 21, and is configured to switch between an off state in which the protection switching element T4 interrupts the flow of current from the first power source unit 91 to the voltage conversion section 10 in the first conduction path 21 and an on state in which the protection switching element T4 cancels the interruption.

The protection switching element T3 functions as a back flow-preventing switching element, and is interposed in the second conduction path 22 and configured to switch between an off state in which the protection switching element T3 interrupts the flow of current from the second power source unit 92 to the voltage conversion section 10 in the second conduction path 22 and an on state in which the protection switching element T3 cancels the interruption.

The second inductor L2 is a filtering inductor, and is configured as a known coil. The second inductor L2 may have a smaller inductance than the first inductor L1, and one end of the second inductor L2 is electrically connected to the first inductor L1 and the capacitor C3.

A capacitor C1 is a first conduction path 21 side noise removal capacitor. One end of the capacitor C1 is electrically connected between the current detection resistor portion R1 and the input-side terminal MV, and the other end of the capacitor C1 is electrically connected to the third conduction path 23 (the ground portion).

A capacitor C4 is a second conduction path 22-side noise removal capacitor. One end of the capacitor C4 is electrically connected between the current detection resistor portion R2 and the output-side terminal LV (specifically, between the switching element T3 and the output-side terminal LV), and the other end of the capacitor C4 is electrically connected to the third conduction path 23 (the ground portion).

The charge circuit section 50 is connected in parallel with the voltage conversion section 10 between the first conduction path 21 and the second conduction path 22, and is configured as a DC/DC converter that performs a step-down operation in which the voltage applied to the second conduction path 22 is stepped down and an output voltage is applied to the first conduction path 21. The charge circuit section 50 includes a switch portion T5, a third inductor L3, and diodes D1 and D2, and can perform a step-down operation in which the voltage applied to the second conduction path 22 is stepped down by the switch portion T5 being switched on and off and an output voltage is applied to the first conduction path 21.

In the charge circuit section 50, the switch portion T5 is configured as an N-channel MOSFET, for example. The drain of the switch portion T5 is electrically connected to the second conduction path 22, and the source of the switch portion T5 is electrically connected to the cathode of the diode D2 and one end of the third inductor L3. The cathode of the diode D2 is electrically connected to the source of the switch portion T5 and the one end of the third inductor L3, and the anode of the diode D2 is electrically connected to the third conduction path 23 (the ground portion). The anode of the diode D1 is electrically connected to the other end of the third inductor L3, and the cathode of the diode D1 is electrically connected to a predetermined portion of the first conduction path 21 (a portion that is electrically connected to the source of the switching element T4, the drain of the switching element T1, and the one end of the capacitor C2). The diode D1 permits the flow of current from the second conduction path 22-side to the first conduction path 21-side and interrupts conduction in the opposite direction. In such a manner, one end of the charge circuit section 50 is electrically connected to the node between the voltage conversion section 10 and the protection switching element T4 in the first conduction path 21, and the other end of the charge circuit section 50 is electrically connected to a node connected to the terminal LV on the output side and the protection switching element T3 in the second conduction path 22. The inductance of the third inductor L3 may be smaller than that of the first inductor L1 and the second inductor L2.

By a PWM signal that is a second control signal (a control signal alternately switching between an on signal and an off signal) being provided from the control unit 30 when a predetermined precharging condition is satisfied and by the switch portion T5 switching on and off in accordance with this PWM signal, the charge circuit section 50 configured in such a manner functions as a diode rectification-type step-down DC/DC converter and performs a step-down operation in which the voltage applied to the second conduction path 22 is stepped down and an output voltage is applied to the first conduction path 21.

The control unit 30 includes a control circuit and a driving unit, for example. The control circuit may be configured as a microcomputer, and includes a CPU that performs various types of computational processing, a ROM that stores information such as a program, a RAM that stores temporarily generated information, the A/D converter, which converts analog voltages that are input into digital values, etc. Detection signals (analog voltage signals that are in accordance with detected voltages) from the voltage detection sections 41 and 42 and detection signals (analog voltage signals that are in accordance with detected currents) from the current detection sections 43, 44 are provided to the A/D converter.

When the control unit 30 causes the voltage conversion section 10 to perform a step-down operation, the control unit 30 periodically repeats a feedback calculation in which a duty ratio is calculated according to a known feedback calculation method (a known PI calculation method, a known PID calculation method, or the like) based on the deviation between a target voltage value set in advance and the voltage value detected by the voltage detection section 42 (the value of the voltage applied to the second conduction path 22), and outputs a PWM signal in accordance with a new duty ratio each time a duty ratio is calculated. Furthermore, in addition to providing the switching element T1 with this PWM signal, the control unit 30 also provides the switching element T2 with a PWM signal that is complementary to the PWM signal provided to the switching element T1 while setting a dead time. In this example, the PWM signal that is provided to the switching element T1 in a case in which the control unit 30 causes the voltage conversion section 10 to perform a step-down operation corresponds to one example of a first control signal. Also, in a case in which the control unit 30 causes the voltage conversion section 10 to perform a step-up operation, the control unit 30 periodically repeats a feedback calculation in which a duty ratio is calculated according to a known feedback calculation method (a known PI calculation method, a known PID calculation method, or the like) based on the deviation between a target voltage value set in advance and the voltage value detected by the voltage detection section 41 (the value of the voltage applied to the first conduction path 21), and outputs a PWM signal in accordance with a new duty ratio each time a duty ratio is calculated. Furthermore, in addition to providing the switching element T2 with this PWM signal, the control unit 30 also provides the switching element T1 with a PWM signal that is complementary to the PWM signal provided to the switching element T2 while setting a dead time.

In such a manner, the power supply device 1 functions as a synchronous rectification-type step-down DC/DC converter, and steps down the DC voltage applied to the first conduction path 21 and outputs the stepped-down voltage to the second conduction path 22 by switching the high-side switching element T1 on and off in accordance with a PWM signal and also switching the low-side switching element T2 on and off synchronously with the operation of the high-side switching element T1. The voltage applied to the second conduction path 22 (the output voltage) is set in accordance with the duty ratio of the PWM signal provided to the gate of the switching element T1. In addition, the power supply device 1 also functions as a synchronous rectification-type step-up DC/DC converter, and steps up the DC voltage applied to the second conduction path 22 and outputs the stepped-up voltage to the first conduction path 21 by switching the low-side switching element T2 on and off in accordance with a PWM signal and also switching the high-side switching element T1 on and off synchronously with the operation of the low-side switching element T2. The voltage applied to the first conduction path 21 (the output voltage) in this case is set in accordance with the duty ratio of the PWM signal provided to the gate of the switching element T2.

Next, the control performed by the power supply device 1 will be described with reference to FIG. 2, etc.

The control unit 30 of the power supply device 1 drives the voltage conversion section 10 and causes the voltage conversion section 10 to perform a voltage conversion operation when a predetermined starting condition is satisfied. Specifically, a predetermined system-on signal (for example, an ignition-on signal) is provided to the control unit 30 from an external device if a predetermined starting switch (for example, a known ignition switch) for switching the vehicle system from an operation stopped state to an operating state is on, and a predetermined system-off signal (for example, an ignition-off signal) is provided to the control unit 30 from the external device if the starting switch is off. Regarding the switching of the starting switch from off to on as the "predetermined precharging condition" for example, the control unit 30 provides the voltage conversion section 10 with a control signal and causes the voltage conversion section 10 to perform a voltage conversion operation.

Figure 2:
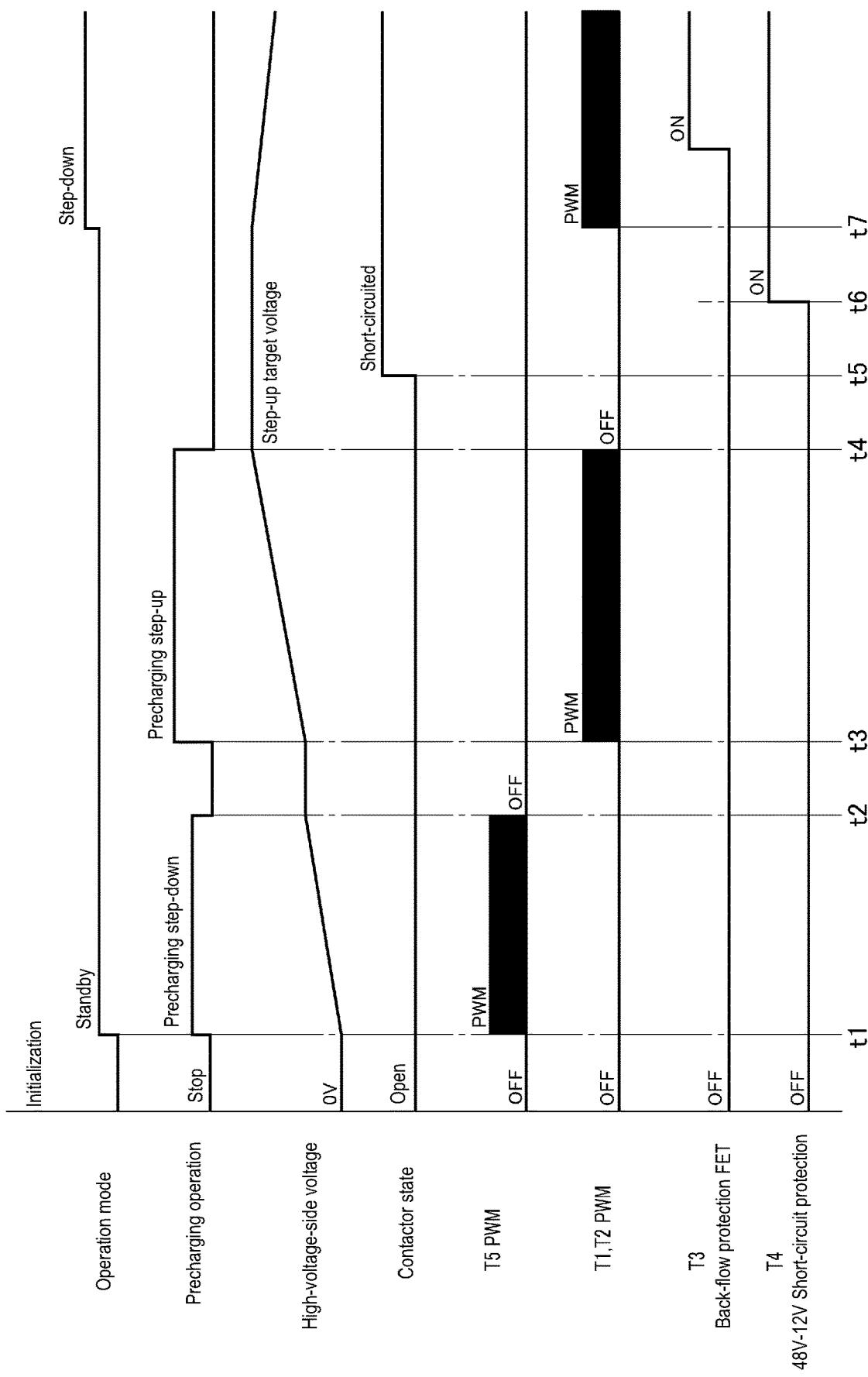
FIG. 2 is a timing chart illustrating examples of a change in operation mode, a change in precharging operation state, a change in a high-voltage-side voltage, a change in a contactor state, a change in control applied to a switch portion T5, a change in control applied to driving switching elements T1 and T2, a change in the state of a back-flow protection switching element T3, and a change in the state of a short-circuit protection switching element T4 before, during, and after a precharging operation in the on-board power supply device according to the first embodiment.

The control unit 30 controls the voltage conversion section 10 according to a procedure as illustrated in FIG. 2, for example.

In the example in FIG. 2, the control unit 30 outputs a PWM signal (the second control signal) to the switch portion T5 of the charge circuit section 50 and causes the charge circuit section 50 to perform a charging operation (step-down operation) at timing t1 when the "predetermined precharging condition" is satisfied (at a timing when the starting switch is switched from off to on). Such an operation is a precharging operation (specifically, a precharging step-down operation), and this precharging step-down operation is performed until timing t2 when the voltage value of the first conduction path 21 equals a first predetermined value (for example, a predetermined value that is at the same level as or slightly lower than the charge voltage of the second power source unit 92). Note that the switching elements T1 and T2 of the voltage conversion section 10 are kept off during the precharging operation.

In the period between time t1 to time t2, during which the precharging step-down operation is performed, the control unit 30 controls the duty ratio of the PWM signal (the second control signal) provided to the switch portion T5 by performing known feedback control so that the value of the current flowing in the first conduction path 21 equals a predetermined target current value while monitoring the current value detected by the current detection section 43. Specifically, the control unit 30 periodically repeats a feedback calculation in which a duty ratio is calculated according to a known feedback calculation method (a known PI calculation method, a known PID calculation method, or the like) based on the deviation between the target current value set in advance and the current value detected by the current detection section 43 (the value of the current flowing in the first conduction path 21), and outputs a PWM signal to the switch portion T5 in accordance with a new duty ratio each time a duty ratio is calculated. Note that the frequency of the second control signal may be set higher than the frequency of the first control signal.

The control unit 30 stops the PWM signal provided to the switch portion T5 at time t2, which is the time when the voltage value of the first conduction path 21 equals the first predetermined value, and switches the switch portion T5 off. Furthermore, starting from time t3 following this, the control unit 30 causes the voltage conversion section 10 to perform a step-up operation. In this step-up operation, while keeping the switch portion T5 off, the control unit 30 controls the duty ratio of the PWM signal provided to the switching element T2 by performing known feedback control so that the value of the current flowing in the first conduction path 21 equals a predetermined target current value while monitoring the current value detected by the current detection section 43. Specifically, the control unit 30 periodically repeats a feedback calculation in which a duty ratio is calculated according to a known feedback calculation method (a known PI calculation method, a known PID calculation method, or the like) based on the deviation between the target current value set in advance and the current value detected by the current detection section 43 (the value of the current voltage flowing in the first conduction path 21), and outputs a PWM signal to the switching element T2 in accordance with a new duty ratio each time a duty ratio is calculated. Furthermore, in addition to providing the switching element T2 with this PWM signal, the control unit 30 also provides the switching element T1 with a PWM signal that is complementary to the PWM signal provided to the switching element T2 while setting a dead time. Such a precharging step-up operation is performed until timing t4 when the voltage value of the first conduction path 21 equals a second predetermined value (for example, a predetermined value that is at the same level as or slightly lower than the charge voltage of the first power source unit 91).

The control unit 30 stops the above-described precharging step-up operation at timing t4, which is the timing when the voltage value of the first conduction path 21 equals the second predetermined value. At the timing of time t5 after the precharging step-up operation is stopped in such a manner, the contactor CT is switched from off (an open state) to on (a short-circuited state). The contactor CT may be turned on and off by a control device other than the control unit 30 or by the control unit 30.

After the contactor CT is switched on at time t5, the control unit 30 switches the protection switching element T4 from off to on at the timing of time t6, and causes the voltage conversion section 10 to perform the above-described step-down operation starting from time t7 following this. This step-down operation is performed until a predetermined end timing (for example, the timing when the above-described starting switch is switched from on to off). Furthermore, following time t7, the control unit 30 switches the protection switching element T3 on.

As described above, in the on-board power supply device 1 according to the present configuration, the charge circuit section 50 operates so as to supply a charge current to the first conduction path 21 due to the control unit 30 providing the charge circuit section 50 with a PWM signal (the second control signal) when the predetermined precharging condition is satisfied. Accordingly, if the predetermined precharging condition is satisfied, capacitive components on the first conduction path 21 (in the example in FIG. 1, the capacitor C2, the capacitor C1, and the capacitive component CP connected to the wiring section 81) can be charged. Moreover, since the charge current can be controlled by switching the switch portion T5 on and off, a configuration with which the current during a precharging operation can be controlled can be realized simply. Note that the capacitive component CP may be a capacitive component present in a load connected to the wiring section 81, or may be a large-capacity capacitor connected to the wiring section 81.

In addition, the power supply device 1 includes the voltage detection section 41, which detects the voltage value of the first conduction path 21. Furthermore, the control unit 30 causes the voltage conversion section 10 to perform a step-up operation in which the voltage applied to the second conduction path 22 is stepped up and applied to the first conduction path 21 when the voltage value of the first conduction path 21, which is detected by the voltage detection section 41, reaches a predetermined value (the first predetermined value) after the control unit 30 outputs a PWM signal (the second control signal) to the switch portion T5 of the charge circuit section 50 when the precharging condition is satisfied. According to this configuration, step-up charging can be performed after step-down charging is performed when a precharging operation of the capacitive components on the first conduction path 21 side is performed, and the charge voltage of the capacitive components can be increased so as to be higher than the voltage of the second conduction path 22.

In addition, the power supply device 1 includes the protection switching element T4, which is disposed in the first conduction path 21 and which switches between an on state in which the protection switching element T4 permits conduction from the first power source unit 91 to the voltage conversion section 10 and an off state in which the protection switching element T4 does not permit conduction from the first power source unit 91 to the voltage conversion section 10, and the capacitor C2, one end of which is electrically connected between the voltage conversion section 10 and the protection switching element T4 in the first conduction path 21 and the other end of which is electrically connected to the third conduction path 23 (ground). Furthermore, one end of the charge circuit section 50 is electrically connected between the voltage conversion section 10 and the protection switching element T4 in the first conduction path 21. By adopting such a configuration, the above-described capacitor C2 can be charged by a precharging operation, and an inrush current into the above-described capacitor C2 can be suppressed after the precharging operation.

In addition, in the power supply device 1, during a precharging step-down operation, the control unit 30 controls the duty ratio of the PWM signal (the second control signal) provided to the switch portion T5 so that the value of the current flowing in the first conduction path 21 equals a predetermined target current value. By adopting such a configuration, the capacitive components can be charged while controlling the current in the first conduction path 21 to a desired value during the precharging step-down operation. Note that the capacitive components can be charged while controlling the current in the first conduction path 21 to a desired value also during a precharging step-up operation.

Second Embodiment

Next, a second embodiment will be described.

Figure 3:
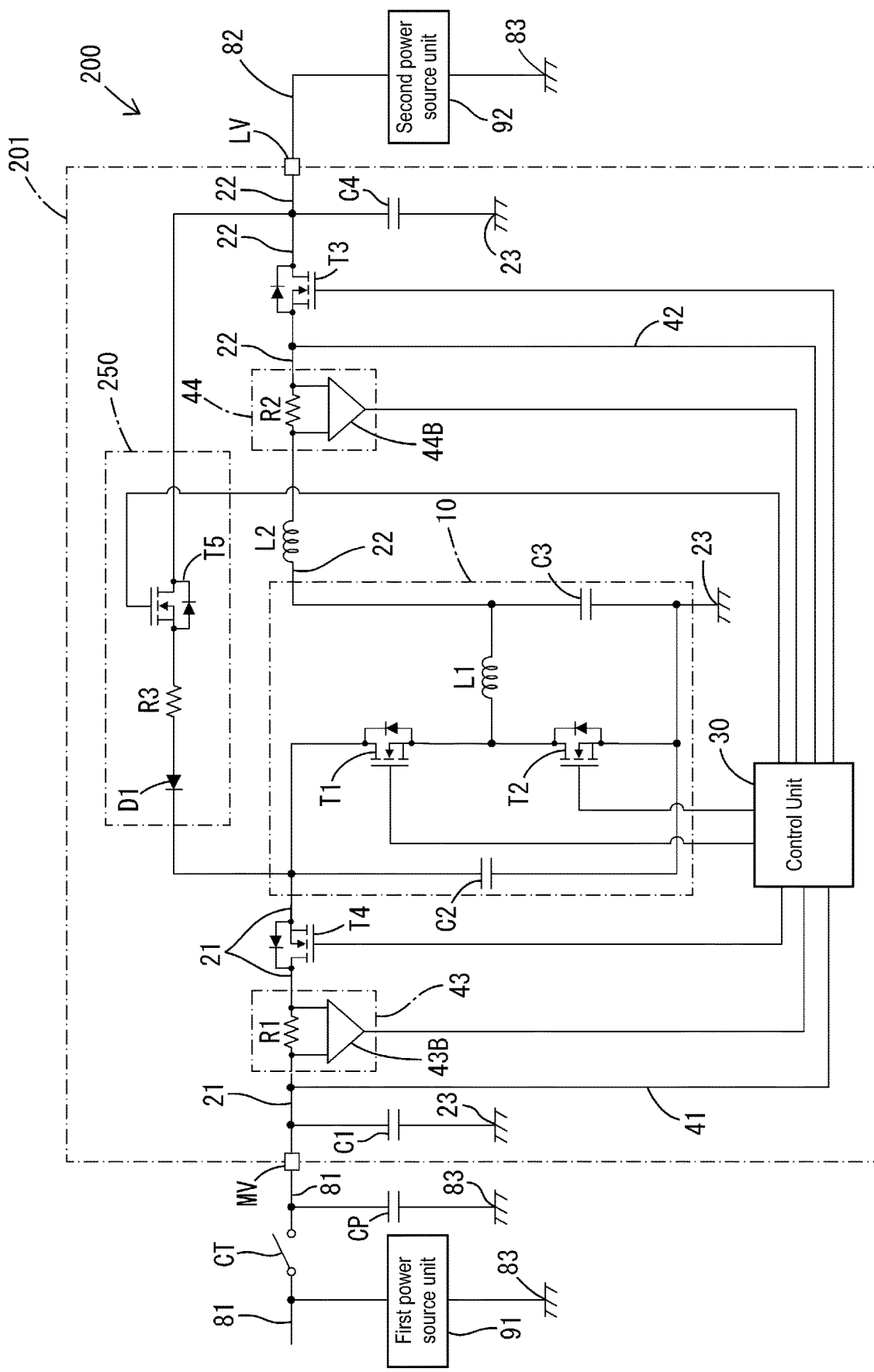
FIG. 3 is a circuit diagram schematically illustrating an example of an on-board power supply system including an on-board power supply device according to a second embodiment.

In an on-board power supply system 200 illustrated in FIG. 3, only a power supply device 201 differs from the power supply device 1, and configurations other than the power supply device 201 are similar to those in the power supply system 100 illustrated in FIG. 1. Also, in the power supply device 201, only the configuration of a charge circuit section 250 differs from the charge circuit section 50, and configurations other than the charge circuit section 250 are similar to those in the power supply device 1 illustrated in FIG. 1. In addition, the control applied to a switch portion T5 of the charge circuit section 250 is similar to the control applied to the switch portion T5 of the charge circuit section 50.

The charge circuit section 250 used in the power supply device 201 in FIG. 3 is connected in parallel with the voltage conversion section 10 between the first conduction path 21 and the second conduction path 22. This charge circuit section 250 is formed by connecting a switch portion T5, a diode D1, and a resistor portion R3 in series. The anode of the diode D1 is disposed on the second conduction path 22-side, and the cathode of the diode D1 is disposed on the first conduction path 21-side. The switch portion T5 is an element similar to the switch portion T5 illustrated in FIG. 1. The drain of the switch portion T5 is electrically connected to the second conduction path 22, and the source of the switch portion T5 is electrically connected to one end of the resistor portion R3. The anode of the diode D1 is electrically connected to the other end of the resistor portion R3, and the cathode of the diode D1 is electrically connected to a predetermined portion of the first conduction path 21 (a portion that is electrically connected to the source of the switching element T4, the drain of the switching element T1, and the one end of the capacitor C2). The diode D1 permits the flow of current from the second conduction path 22 to the first conduction path 21 and interrupts conduction in the opposite direction. In such a manner, one end of the charge circuit section 250 is electrically connected to the node between the voltage conversion section 10 and the protection switching element T4 in the first conduction path 21, and the other end of the charge circuit section 50 is electrically connected to a portion located on the output-side terminal LV-side from the protection switching element T3 in the second conduction path 22.

Also in the power supply device 201 configured in such a manner, a precharging step-down operation is started and a PWM signal (the second control signal alternately switching between an on signal and an off signal) is output to the switch portion T5 of the charge circuit section 250 when the precharging condition is satisfied (time t1 in FIG. 2), similarly to the power supply device 1 in FIG. 1. Furthermore, the precharging step-down operation is stopped at timing t2 (FIG. 2), which is similar to that in the power supply device 1 in FIG. 1. In addition, in this example as well, the control unit 30 causes the voltage conversion section 10 to perform a step-up operation (a precharging step-up operation) in which the voltage applied to the second conduction path 22 is stepped up and applied to the first conduction path 21 in a case in which the voltage value of the first conduction path 21, which is detected by the voltage detection section 41, reaches a predetermined value (the first predetermined value) after the control unit 30 outputs a PWM signal (the second control signal) to the switch portion T5 of the charge circuit section 250 when the precharging condition is satisfied. The precharging step-up operation is similar to that in the power supply device 1, and the end timing of the precharging step-up operation is also similar to that in the power supply device 1. Also, in this example as well, the control unit 30 controls the duty ratio of the PWM signal (the second control signal) provided to the switch portion T5 so that the value of the current flowing in the first conduction path 21 equals a predetermined target current value during the precharging step-down operation, and the control unit 30 controls the duty ratio of the PWM signal (the second control signal) provided to the switching element T2 so that the value of the current flowing in the first conduction path 21 equals a predetermined target current value also during the precharging step-up operation.

Effects similar to those of the first embodiment can also be achieved with the above-described configuration of the second embodiment.

Other Embodiments

The present disclosure is not limited to the embodiments that have been explained based on the description above and the drawings, and embodiments such as those described below are also included in the technical scope of the present disclosure, for example. In addition, various features of the above-described embodiments and the later-described embodiments can be combined in any way as long as the features that are combined do not contradict with one another.

In the first embodiment, an example in which the charge circuit section is configured as a synchronous rectification-type DC/DC converter is described. However, the charge circuit section may also be configured as a diode-type DC/DC converter.

In the first and second embodiments, examples in which only one voltage conversion section is disposed are described. However, a multiphase-type DC/DC converter in which a plurality of voltage conversion sections are disposed in parallel may also be adopted.

Figure 4:
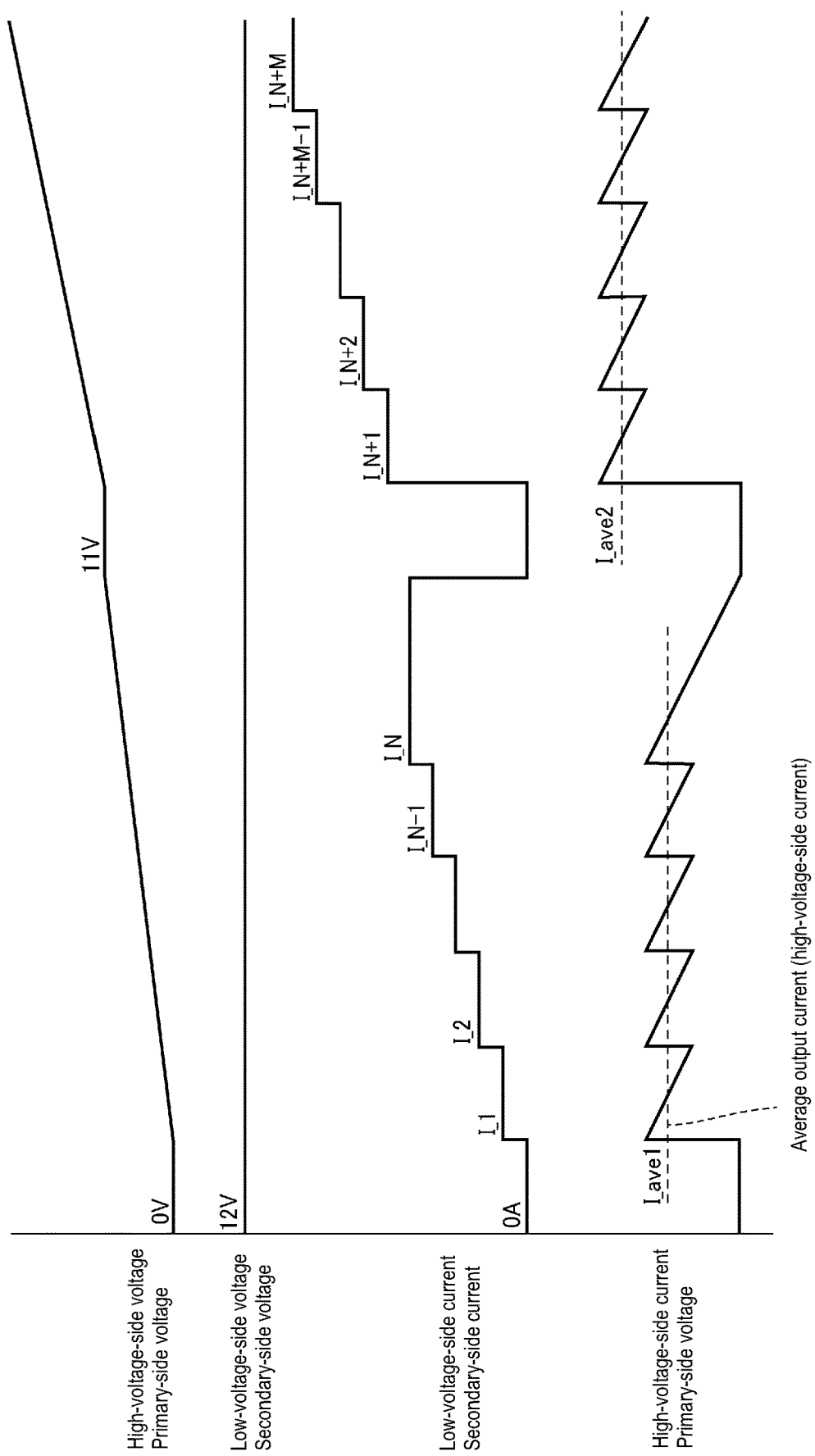
FIG. 4 is an explanatory diagram for explaining a control method in another embodiment.

In the first and second embodiments, one example in which the current in the first conduction path 21 is controlled to be constant during a precharging operation is described. However, the current in the first conduction path 21 may also be controlled to be constant according to a method differing from that in the first and second embodiments. For example, the charge circuit section 50 can be controlled while detecting the current (input current) flowing in the second conduction path 22 in a case in which the current detection section 44 is disposed between the output-side terminal LV and the connection portion of the charge circuit section 50 in the second conduction path 22 in the configuration in FIG. 1. Specifically, control so that the average output current is constant may be performed by setting a target current of the input current (the current flowing into the charge circuit section 50 through the second conduction path 22) based on an input voltage (the voltage of the second conduction path 22) and an output voltage (the voltage of the first conduction path 21) during a precharging operation, and an anticipated efficiency that is anticipated in advance, as in the example illustrated in FIG. 4. In this case, supposing that the anticipated efficiency in a case in which a step-down operation is performed using the charge circuit section 50 is constant at 85%, the input current Iin in a case in which the step-down operation is performed so that the first conduction path 21-side equals a predetermined output voltage (for example, 1V) and the output current equals a predetermined current value (5A) with the second conduction path 22-side being set to a predetermined input voltage (for example, 12V) can be expressed by $Iin \times Vin \times \alpha = Iout \cdot Vout$, where $\alpha$ is the efficiency, Vin is the input voltage, Iout is the output current, and Vout is the output voltage, and equals $Iin(Iout \times Vout/Vin)/\alpha$. Accordingly, it suffices to set the target value of the input current Iin so that the desired output current Iout is obtained. Note that, in the example in FIG. 4, an example of a case in which the primary-side (first conduction path 21-side) voltage is gradually increased 1V at a time is illustrated.

Also, during a precharging operation performed by the charge circuit section 50 performing a step-down operation, by using a method such as that in JP 2016-208759 A, the output current (the current in the first conduction path 21) may be controlled so as to equal a desired target current value based on the input voltage (the voltage of the second conduction path 22) and the output voltage (the voltage of the first conduction path 21).

The invention claimed is:

1. An on-board power supply device that at least performs a voltage conversion operation in which a voltage applied to a first conduction path that serves as an electric power supply path from a first power source unit is converted and an output voltage is applied to a second conduction path disposed on a second power source unit-side, the on-board power supply device comprising:
    a voltage conversion section that includes a driving switching element that switches on and off when a first control signal that is alternately switched between an on signal and an off signal is provided, the voltage conversion section performing a voltage conversion operation in which a voltage applied to the first conduction path is stepped up or down by the driving switching element switching on and off and is applied to the second conduction path;
    a control unit that outputs the first control signal to the driving switching element; and
    a charge circuit section that is connected in parallel with the voltage conversion section between the first conduction path and the second conduction path, that includes a diode, a switch portion and an inductor, and that performs a step-down operation in which a voltage applied to the second conduction path is stepped down by the switch portion switching on and off and an output voltage is applied to the first conduction path, the diode having a cathode disposed on the first conduction path, the diode interposed between the first conduction path and the switch portion,
    wherein the control unit outputs a second control signal that alternately switches between an on signal and an off signal to the switch portion of the charge circuit section when a predetermined precharging condition is satisfied.

2. The on-board power supply device according to claim 1, further comprising:
    a voltage detection section that detects a voltage value of the first conduction path,
    wherein the control unit causes the voltage conversion section to perform a step-up operation in which a voltage applied to the second conduction path is stepped up and applied to the first conduction path in a case in which the voltage value of the first conduction path, which is detected by the voltage detection section, reaches a predetermined value after the control unit outputs the second control signal to the switch portion of the charge circuit section when the precharging condition is satisfied.

3. The on-board power supply device according to claim 2, further comprising:
    a protection switching element that is disposed in the first conduction path and that switches between an on state in which the protection switching element permits conduction from the first power source unit-side to the voltage conversion section-side and an off state in which the protection switching element does not permit conduction from the first power source unit-side to the voltage conversion section-side; and
    a capacitor, one end of which is electrically connected between the voltage conversion section and the protection switching element in the first conduction path and the other end of which is electrically connected to a ground-side, wherein
    one end of the charge circuit section is electrically connected between the voltage conversion section and the protection switching element in the first conduction path.

4. The on-board power supply device according to claim 2, wherein the control unit controls a duty ratio of the second control signal so that a value of a current flowing in the first conduction path equals a predetermined target current value.

5. The on-board power supply device according to claim 1, further comprising:
    a protection switching element that is disposed in the first conduction path and that switches between an on state in which the protection switching element permits conduction from the first power source unit-side to the voltage conversion section-side and an off state in which the protection switching element does not permit conduction from the first power source unit-side to the voltage conversion section-side; and
    a capacitor, one end of which is electrically connected between the voltage conversion section and the protection switching element in the first conduction path and the other end of which is electrically connected to a ground-side, wherein
    one end of the charge circuit section is electrically connected between the voltage conversion section and the protection switching element in the first conduction path.

6. The on-board power supply device according to claim 5, wherein the control unit controls a duty ratio of the second control signal so that a value of a current flowing in the first conduction path equals a predetermined target current value.

7. The on-board power supply device according to claim 1, wherein the control unit controls a duty ratio of the second control signal so that a value of a current flowing in the first conduction path equals a predetermined target current value.

8. An on-board power supply device that at least performs a voltage conversion operation in which a voltage applied to a first conduction path that serves as an electric power supply path from a first power source unit is converted and an output voltage is applied to a second conduction path disposed on a second power source unit-side, the on-board power supply device comprising:
    a voltage conversion section that includes a driving switching element that switches on and off when a first control signal that is alternately switched between an on signal and an off signal is provided, the voltage conversion section performing a voltage conversion operation in which a voltage applied to the first conduction path is stepped up or down by the driving switching element switching on and off and is applied to the second conduction path;
    a control unit that outputs the first control signal to the driving switching element; and
    a charge circuit section which is connected in parallel with the voltage conversion section between the first conduction path and the second conduction path, which is formed by at least a switch portion, a diode, and a resistor portion, the switch portion, the diode and the resistor portion being connected in series with each other, and in which an anode of the diode is disposed on the second conduction path-side and a cathode of the diode is disposed on the first conduction path-side, wherein the control unit outputs a second control signal that alternately switches between an on signal and an off signal to the switch portion of the charge circuit section when a predetermined precharging condition is satisfied.

9. The on-board power supply device according to claim 8, further comprising:
a voltage detection section that detects a voltage value of the first conduction path,
wherein the control unit causes the voltage conversion section to perform a step-up operation in which a voltage applied to the second conduction path is stepped up and applied to the first conduction path in a case in which the voltage value of the first conduction path, which is detected by the voltage detection section, reaches a predetermined value after the control unit outputs the second control signal to the switch portion of the charge circuit section when the precharging condition is satisfied.

10. The on-board power supply device according to claim 8, further comprising:
a protection switching element that is disposed in the first conduction path and that switches between an on state in which the protection switching element permits conduction from the first power source unit-side to the voltage conversion section-side and an off state in which the protection switching element does not permit conduction from the first power source unit-side to the voltage conversion section-side; and
a capacitor, one end of which is electrically connected between the voltage conversion section and the protection switching element in the first conduction path and the other end of which is electrically connected to a ground-side, wherein
one end of the charge circuit section is electrically connected between the voltage conversion section and the protection switching element in the first conduction path.

11. The on-board power supply device according to claim 8, wherein the control unit controls a duty ratio of the second control signal so that a value of a current flowing in the first conduction path equals a predetermined target current value.

* * * * *